United States Patent [19]

Ohwada et al.

[11] Patent Number: 4,943,116
[45] Date of Patent: Jul. 24, 1990

[54] RECLINING ANGLE ADJUSTMENT DEVICE

[76] Inventors: Akira Ohwada; Masanori Sakai; Yasuhisa Tsutsumi, all c/o Shiroki Kinzoku Kogyo Kabushiki Kaisha, 2 Kirihara-cho, Fujisawa-shi, Kanagawa-ken 252, Japan

[21] Appl. No.: 307,165

[22] Filed: Feb. 6, 1989

Related U.S. Application Data

[63] Continuation of Ser. No. 138,083, Dec. 28, 1987, abandoned.

[51] Int. Cl.⁵ .................................................. B60N 2/02
[52] U.S. Cl. ....................................... 297/362; 74/409; 475/162
[58] Field of Search ................... 297/362; 74/409, 804, 74/808

[56] References Cited

U.S. PATENT DOCUMENTS

| | | | |
|---|---|---|---|
| 4,020,717 | 5/1977 | Johnson | 297/362 |
| 4,304,438 | 12/1981 | Nardi | 297/362 |
| 4,453,767 | 6/1984 | Walk et al. | 297/362 |
| 4,629,250 | 12/1986 | Tezuka et al. | 297/362 |
| 4,629,251 | 12/1986 | Tezuka | 297/362 |
| 4,708,392 | 11/1987 | Werner et al. | 297/362 |
| 4,715,655 | 12/1987 | Katsumoto et al. | 297/362 |
| 4,717,204 | 11/1988 | Tezuka | 297/362 |
| 4,832,405 | 5/1989 | Werner et al. | 297/362 |

FOREIGN PATENT DOCUMENTS 2107386 4/1983 United Kingdom ................ 297/362

Primary Examiner—Peter R. Brown
Assistant Examiner—Brian K. Green
Attorney, Agent, or Firm—Finnegan, Henderson, Farabow, Garrett & Dunner

[57] ABSTRACT

A reclining angle adjustment device for a seat includes a shaft having a concentric portion and an eccentric portion and rotatable for adjusting the reclining angle of the seat, a tapered bushing having a tapered inner peripheral surface engaging the eccentric portion along the shaft, a gear train including an external gear and an internal gear meshing with the internal gear, the internal gear having more teeth than the external gear, a first arm having one of the external and internal gears which is rotatably fitted at its center over the concentric portion, and a second arm having the other gear which is rotatably fitted at its center over the tapered bushing. A resilient member normally presses the tapered bushing axially of the shaft in a direction to strengthen meshing engagement between the external and internal gears.

3 Claims, 4 Drawing Sheets

RECLINING ANGLE ADJUSTMENT DEVICE

This application is a continuation of application Ser. No. 07/138,083, filed Dec. 28, 1987, now abandoned.

BACKGROUND OF THE INVENTION

The present invention relates to a reclining angle adjustment device for adjusting the angle of inclination of the seat back of a reclining seat in a motor vehicle, i.e., the reclining angle of the reclining seat.

There are known reclining angle adjustment devices in which the reclining angle is adjusted by means of a planetary gear mechanism.

The planetary gear mechanism employed in the reclining angle adjustment device is composed of a first arm having an external gear, a second arm having an internal gear with more teeth than the external gear, and a shaft having a concentric portion inserted through the center of the external gear and an eccentric portion inserted through the center of the internal gear. The external and internal gears are held in mesh with each other through the shaft. When the shaft is rotated about its own axis, the angle of the first arm with respect to the second arm is varied. Therefore, by attaching one of the first and second arms to the frame of the seat back of a seat and the other arm to the frame of the seat cushion thereof, the reclining angle of the seat can be adjusted by rotating the shaft.

The first arm, the second arm, and the shaft are machined so that they mesh without biting into each other irrespective of machining tolerances. Therefore, there are always gaps or backlashes between fitting and meshing members of the first arm, the second arm, and the shaft. These gaps or backlashes result in unwanted motion of the seat back with respect to the seat cushion, making the person on the seat uncomfortable and producing noise. While the motor vehicle is running, the first arm may vibrate with respect to the second arm due to vibration of the motor vehicle, and the shaft may temporarily become free to rotate of its own accord about its own axis, so that the second arm and hence the seat back may be tilted even when no angle adjustment is made for the seat back. The discomfort which the person on the seat may suffer, the noise produced by the seat back, and the accidental rotation of the shaft tend to increase with increased gaps due to localized machining tolerances of the members.

SUMMARY OF THE INVENTION

It is an object of the present invention to provide a reclining angle adjustment device which will not make the person on a seat uncomfortable and not give out noise due to backlash-induced movement.

Another object of the present invention is to provide a reclining angle adjustment device having a shaft which will not rotate of its own accord about its own axis.

Still another object of the present invention is to provide a reclining angle adjustment device having a relatively simple structure for preventing a shaft from rotating about its own axis.

A further object of the present invention is to provide a reclining angle adjustment device for a seat, comprising a shaft having a concentric portion and an eccentric portion and rotatable for adjusting the reclining angle of the seat, a tapered bushing having a tapered inner peripheral surface engaging said eccentric portion of the shaft, a gear train including an external gear and an internal gear meshing with said internal gear, said internal gear having more teeth than said external gear, a first arm having one of said external and internal gears, said one of the external and internal gears being rotatably fitted at its center over said concentric portion, a second arm having the other of said external and internal gears, said other of the external and internal gears being rotatably fitted at its center over said tapered bushing, and a resilient member engaging said tapered bushing for normally pressing the tapered bushing axially along said shaft in a direction to strengthen meshing engagement between said external and internal gears.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE EMBODIMENT

Figure 1:
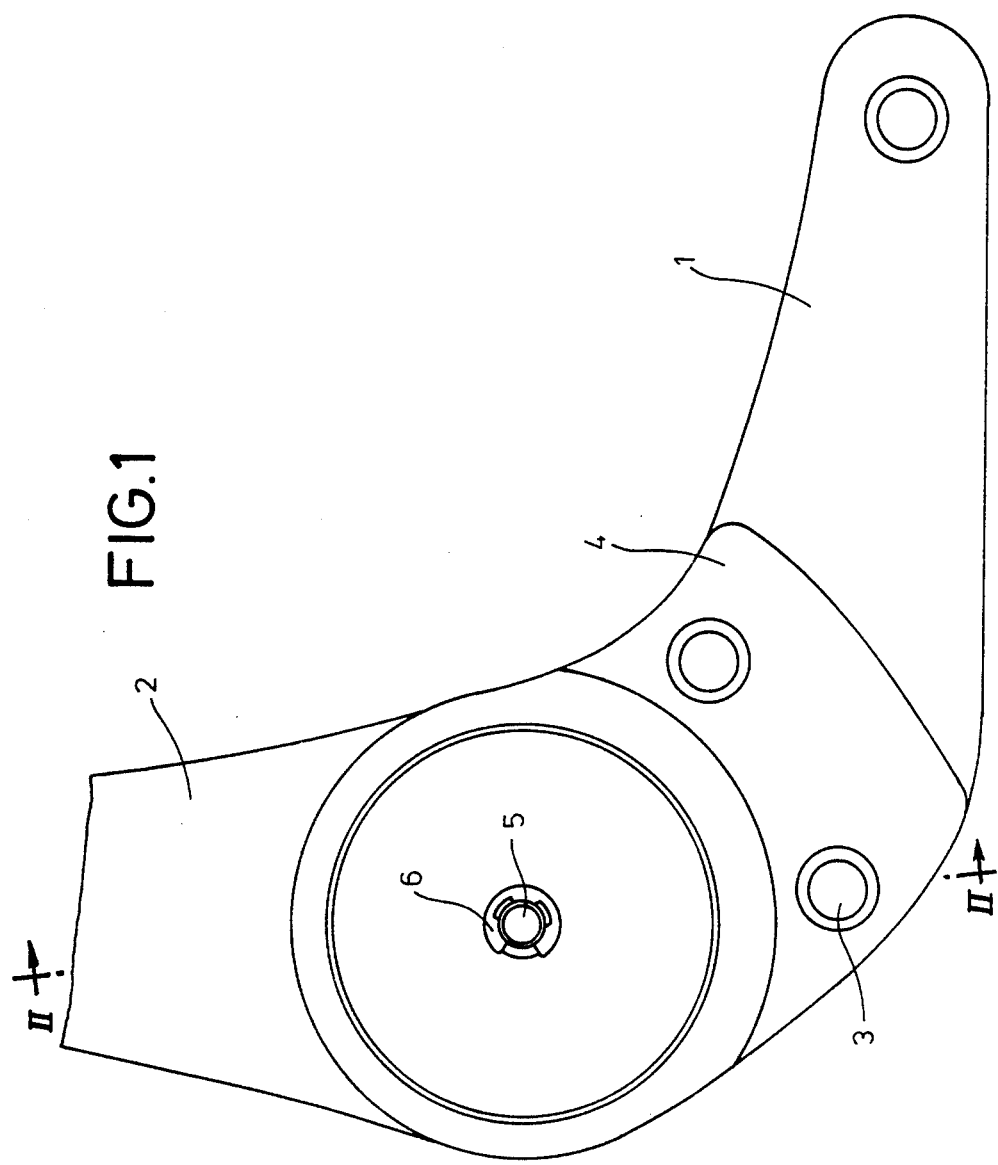
FIG. 1 is a side elevational view of a reclining angle adjustment device according to the present invention.
Figure 2:
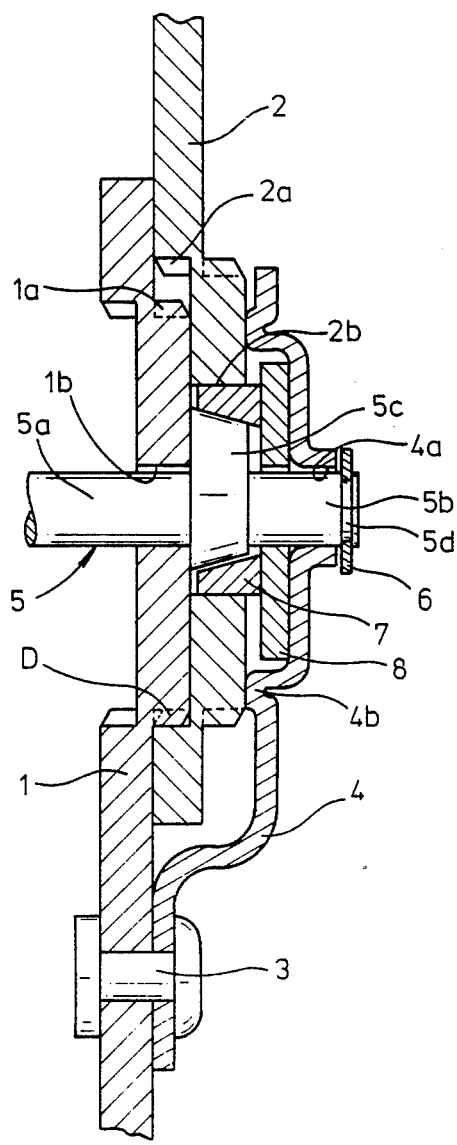
FIG. 2 is a cross-sectional view taken along line II—II of FIG. 1.
Figure 4:
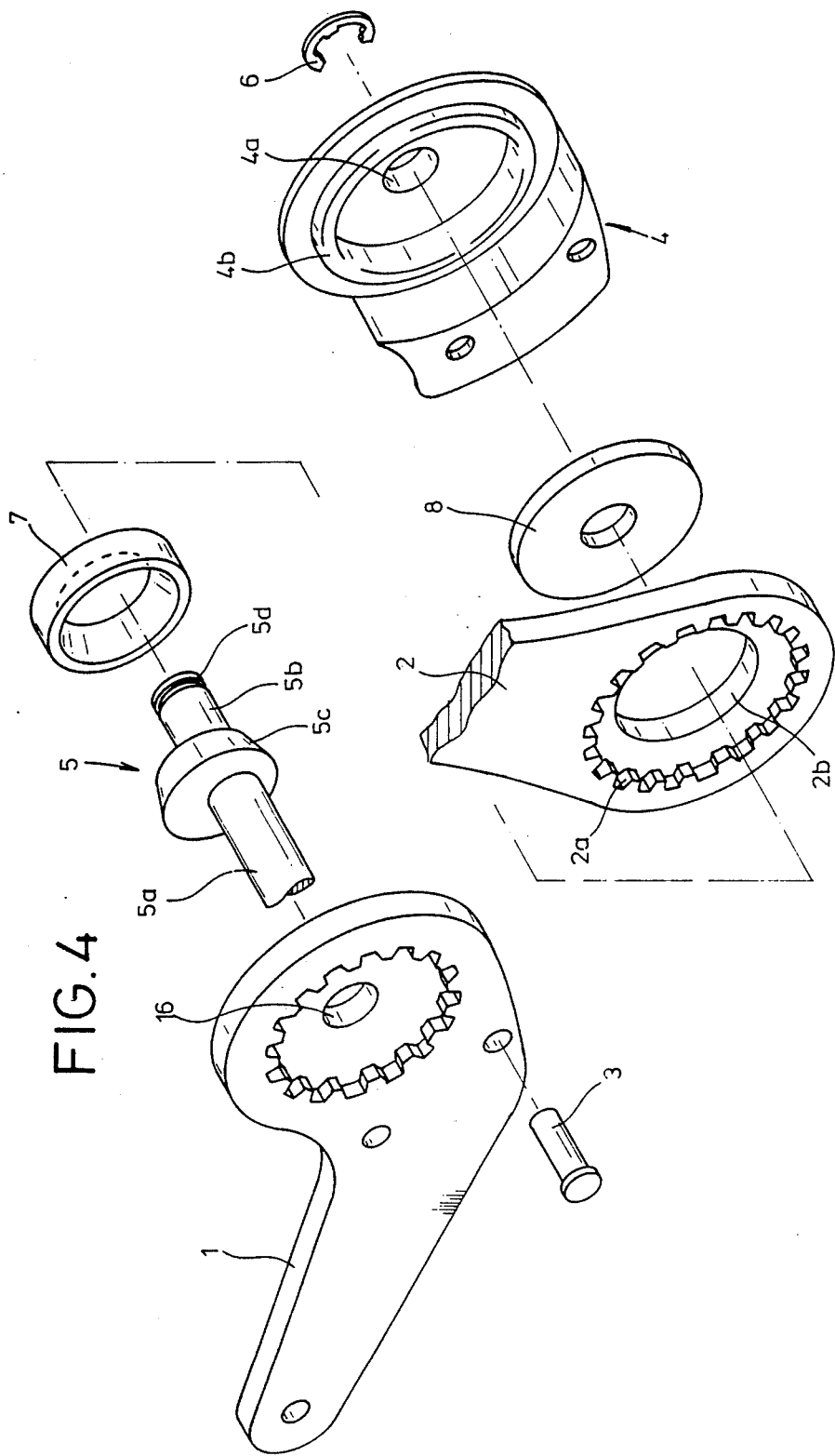
FIG. 4 is an exploded perspective view of the reclining angle adjustment device.

As shown in FIGS. 1 and 2, a reclining angle adjustment device according to the present invention includes a lower arm (first arm) 1 fixed to the seat cushion frame (not shown) of a reclining seat, and an upper arm (second arm) 2 fixed to the seat back frame (not shown) of the reclining seat. As illustrated in FIG. 2, the lower and upper arms 1, 2 have external and internal gears 1a, 2a, respectively, embossed on sides thereof as by precision pressing. The number of teeth of the internal gear 2a is selected to be at least one larger than the number of teeth of the external gear 12a. A cover 4 is secured to the side of the lower arm 1 facing the upper arm 2 by means of rivets 3. As shown in FIGS. 2 and 4, a shaft 5 has axially spaced concentric portions 5a, 5b and a tapered eccentric portion 5c disposed between the concentric portions 5a, 5b. The concentric portion 5a fits in a hole 1b defined centrally in the external gear 1a of the lower arm 1, whereas the concentric portion 5b fits in a hole 4a in the cover 4. A tapered bushing 7 having a conical tapered inner surface fits over the eccentric portion 5c which has a conical tapered outer surface. The tapered bushing 7 fits in a hole 2b defined centrally in the internal gear 2a.

The upper arm 2 and the lower arm 1 are rotatably mounted respectively on the eccentric portion 5c (tapered bushing 7) and the concentric portion 5a of the shaft 5. The external gear 1a and the internal gear 2a are held in mesh with each other. The lower arm 1, the upper arm 2, and the shaft 5 jointly constitute a gear train mechanism.

The cover 4 has an annular ridge 4b on its surface facing the upper arm 2, the annular ridge 4b abutting against the upper arm 2. The shaft 5 has an annular groove 5d defined in one end thereof, and a retaining ring 6 is fitted in the groove 5d to hold the cover 4 on the shaft 5. A means for rotating the shaft 5, such as an angle adjusting handle, not shown, is mounted on the other end of the shaft 5, so that the shaft 5 can be rotated about its own axis by the handle. A circular plate-like resilient member 8 is disposed under compression between the tapered bushing 7 and the cover 4. The resilient member 8 is held against the tapered bushing 7 and the cover 4 for normally pressing the tapered bushing 7 toward the lower arm 1, i.e., to the left in FIG. 2 in the axial direction of the shaft 5.

Figure 3:
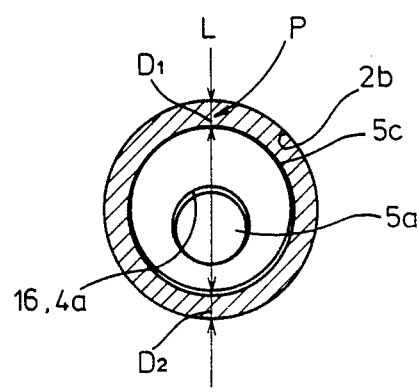
FIG. 3 is a view showing the positional relationship between an external gear, an internal gear, and a shaft of the reclining angle adjustment device.

Operation of the reclining angle adjustment device thus constructed will be described below. When the shaft 5 is rotated, the upper arm 2 is turned at a certain speed reduction ratio by the gear train mechanism to adjust the angle of the seat back. The tapered bushing 7 is normally pressed toward the lower arm, 1 under the resilient force from the resilient member 8. As shown in FIG. 3, the distance $D_1$ between the inner peripheral surface of the hole 2b of the upper arm 2 and the outer peripheral surface of the eccentric portion 5c in the direction (referred to as the "eccentric direction") in which the eccentric portion 5c is displaced off center is smaller than the distance $D_2$ therebetween in the direction diametrically opposite to the eccentric direction ($D_1 < D_2$), so that the tapered bushing 7 serves as a wedge at a position P in FIG. 3 or in the eccentric direction. Since the bushing 7 serves as a wedge, the upper arm 2 is urged in a direction to strengthen the meshing engagement between the internal and external gears 2a, 1a, i.e., in the eccentric direction under the bias of the resilient member 8. Therefore, the meshing region D of the internal and external gears 2a, 1a is free of backlash. The concentric portion 5a of the shaft 5 is held against an inner peripheral surface of the hole 1b, and the concentric portion 5b is held against an inner peripheral surface of the hole 4a.

With the arrangement of the present invention, the shaft 5 and the inner peripheral surfaces of the holes 1b, 4a which engage the shaft 5 are pressed against each other under the resilient force of the resilient member 8 applied through the wedging tapered bushing 7. Moreover, the internal and external gears 2a, 1a are forced into mesh with each other in the meshing region D under the resilient force of the resilient member 8 applied through the wedging tapered bushing 7. Therefore, no backlash is present between these engaging members, and the person on the seat will not be made uncomfortable and no noise will be produced by backlashes which would otherwise exist. Even when the seat is subjected to vibration while the vehicle is running, the upper arm 2 is prevented from becoming temporarily free from the lower arm 1 to allow the upper arm 2 and hence the seat back to turn or be tilted without any angle adjustment.

The external gear may be on the upper arm and the internal gear may be on the lower arm, and the eccentric portion of the shaft may be rotatably disposed in the external gear and the concentric portion may be rotatably disposed in the internal gear.

Although a certain preferred embodiment has been shown and described, it should be understood that many changes and modifications may be made therein without departing from the scope of the appended claims.

What is claimed is:

1. A reclining angle adjustment device for a seat, comprising:
   a shaft having a concentric portion and an eccentric portion and rotatable for adjusting the reclining angle of the seat;
   a tapered bushing having a tapered inner peripheral surface engaging said eccentric portion of the shaft;
   a gear train including an external gear and an internal gear meshing with said external gear, said internal gear having more teeth than said external gear;
   a first arm having one of said external and internal gears, said one of the external and internal gears being rotatably fitted at its center over said concentric portion;
   a second arm having the other of said external and internal gears, said other of the eternal and internal gears being rotatably fitted at its center over said tapered bushing; and
   a resilient member engaging said tapered bushing for normally pressing the tapered bushing axially along said shaft in a direction to strengthen meshing engagement between said external and internal gears.

2. A reclining angle adjustment device according to claim 1, wherein said external gear is disposed on said first arm, said internal gear is disposed on said second arm, further inducing a cover cooperating with said first arm in sandwiching said second arm therebetween, said resilient member being disposed between said cover and said second arm for pressing said tapered bushing.

3. A reclining angle adjustment device according to claim 2, wherein said resilient member comprises a circular plate through which said shaft extends.

* * * * *

UNITED STATES PATENT AND TRADEMARK OFFICE
CERTIFICATE OF CORRECTION

PATENT NO. : 4,943,116

DATED : July 24, 1990

INVENTOR(S) : Akira OHWADA et al.

It is certified that error appears in the above-identified patent and that said Letters Patent is hereby corrected as shown below:

Claim 1, column 4, line 32, change "eternal" to --external--.

Claim 2, column 4, line 42, change "inducing" to --including--.

Signed and Sealed this

Seventh Day of January, 1992

Attest:

HARRY F. MANBECK, JR.

*Attesting Officer*     *Commissioner of Patents and Trademarks*